(12) United States Patent
Fukushima et al.

(10) Patent No.: US 8,689,245 B2
(45) Date of Patent: Apr. 1, 2014

(54) OPTICAL PICKUP DEVICE TRANSFER MECHANISM

(75) Inventors: Yasuhisa Fukushima, Osaka (JP); Kenji Shiomi, Osaka (JP); Masakazu Ishizuka, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/611,337

(22) Filed: Sep. 12, 2012

(65) Prior Publication Data

US 2013/0174678 A1    Jul. 11, 2013

(30) Foreign Application Priority Data

Jan. 11, 2012   (JP) ............................... P 2012-002741

(51) Int. Cl.
*G11B 7/08* (2006.01)

(52) U.S. Cl.
USPC .......................................... 720/663; 720/675

(58) Field of Classification Search
CPC ............... G11B 7/08582; G11B 7/082; G11B 17/0282; G11B 7/0956; G11B 7/22; G11B 11/10571
USPC ........................... 720/663–665, 674–677, 672
See application file for complete search history.

(56) References Cited

U.S. PATENT DOCUMENTS

| | | | | |
|---|---|---|---|---|
| 5,535,076 A * | 7/1996 | Kamioka et al. | ........... | 360/267.4 |
| 5,889,638 A * | 3/1999 | Kabasawa et al. | ......... | 360/261.3 |
| 6,046,974 A * | 4/2000 | Uehara | .......................... | 720/663 |
| 6,058,098 A * | 5/2000 | Kato | .............................. | 720/663 |
| 6,317,287 B1 * | 11/2001 | Yano et al. | ..................... | 360/260 |
| 6,700,859 B2 * | 3/2004 | Oono et al. | .................... | 369/223 |
| 6,922,841 B2 * | 7/2005 | Lee et al. | ....................... | 720/677 |
| 7,328,445 B2 * | 2/2008 | Park et al. | ...................... | 720/676 |
| 8,028,309 B2 * | 9/2011 | Lin et al. | ....................... | 720/677 |
| 8,051,440 B2 * | 11/2011 | Lin et al. | ....................... | 720/663 |
| 8,151,287 B2 * | 4/2012 | Oshima et al. | ................ | 720/664 |
| 2003/0235139 A1 * | 12/2003 | Takeuchi | ...................... | 369/223 |
| 2004/0205795 A1 * | 10/2004 | Choi | ............................. | 720/679 |
| 2006/0161938 A1 * | 7/2006 | Bae et al. | ...................... | 720/663 |
| 2006/0212890 A1 * | 9/2006 | Miki et al. | ..................... | 720/676 |
| 2011/0258647 A1 * | 10/2011 | Akimoto et al. | .............. | 720/663 |
| 2013/0174678 A1 * | 7/2013 | Fukushima et al. | ......... | 74/89.23 |

FOREIGN PATENT DOCUMENTS

| | | |
|---|---|---|
| JP | 63-16657 | 2/1988 |
| JP | 5-65948 | 3/1993 |
| JP | 11-154382 | 6/1999 |
| JP | 2005-93037 | 4/2005 |

* cited by examiner

*Primary Examiner* — Brian Miller
(74) *Attorney, Agent, or Firm* — Wenderoth, Lind & Ponack, LLP.

(57) ABSTRACT

A feed-screw type optical pick-up device transfer mechanism is provided for transferring an optical pick-up device through a base member coupled to a follower member in a state in which teeth of the follower member are engaged with a screw portion threaded around an external circumference of a driveshaft. The teeth of the follower member include two main teeth relating to the transfer of the optical pick-up device, and at least one subsidiary tooth provided between the two main teeth and not related to the transfer of the optical pick-up device.

9 Claims, 6 Drawing Sheets

OPTICAL PICKUP DEVICE TRANSFER MECHANISM

BACKGROUND OF THE INVENTION

The present invention relates to transfer mechanisms, in particular to a feed-screw type transfer mechanism, for transferring an optical pick-up device used in an optical disc drive.

Conventionally, so-called "feed-screw type" transfer mechanisms have been commonly used for transferring an optical pick-up device used in an optical disc drive (see Patent Literature 1: Japanese Patent Laid-open Publication No. 2005-93037, for example). As have been well known, a typical feed-screw type transfer mechanism includes a drive shaft provided with an external screw around its external circumference and a follower member having teeth that are engaged with the external screw, and the mechanism is configured such that driving the drive shaft to rotate by a predetermined amount using a motor feeds the follower member by a predetermined amount along a longitudinal axis of the drive shaft, and whereby an optical pick-up device is transferred in the same direction by a predetermined amount in association with the follower member.

However, according to the conventional configuration disclosed in Patent Literature 1 (Japanese Patent Laid-open Publication No. 2005-93037), as illustrated in FIG. 9, the optical pick-up device transfer mechanism is provided with a feed screw 10 (drive shaft) configured as a common single-thread screw and having a screw portion 10a around its external circumference, and a teeth portion (follower member) 23 including three teeth 23a that are engaged with the screw portion 10a. In order to transfer an optical pick-up device coupled to the follower member 23 at a high speed and with high accuracy by engaging the three teeth 23a of the follower member 23 with the screw portion 10a of the drive shaft 10, processing and finishing with very high accuracy are required for such as dimensions, sizes, and surface finish of the screw portion 10a of the drive shaft 10 and the three teeth 23a of the follower member 23. This disadvantageously results in an increased cost.

Further, conventionally, as illustrated in FIG. 8, for example, an external screw having a relatively large feed pitch (3-mm pitch, for example) has been generally used as a screw portion 242 of a drive shaft 240 in order to realize high speed transfer. Therefore, a circumferential surface portion 242c of an outer circumference provided between adjacent thread grooves 242g and 242g (a flat portion of an outer circumference in a cross-section of the drive shaft) becomes relatively large. Accordingly, when an impact load is applied to an assembly of the drive shaft 240 and a follower member 250 due to, for example, a fall during distribution of the disc drive or handling of a component unit including an optical pick-up device transfer mechanism, there is a problem that a so-called "running over of teeth" phenomenon, in which teeth 256 of the follower member 250 fall out of the thread grooves 242g of the screw portion 242 of the drive shaft 240 and run over the circumferential surface portion 242c of the outer circumference, can easily occur. Once this phenomenon occurs, it is difficult to recover to a previous state, and the optical pick-up device cannot be transferred.

In order to address such a "running over of teeth" phenomenon, as illustrated in FIG. 7, for example, using a double-thread screw as a feed screw 142 provided over an external circumference of a drive shaft 140 can be conceived. As have been well known, the double-thread feed screw 142 is configured by threading an additional single-thread screw 144 separately provided between the threads of a single-thread screw 143 at the same feed pitch. Using the double-thread screw 142 thus configured can decrease a circumferential surface portion 142c of an outer circumference provided between adjacent thread grooves 143g and 144g as compared to a common single-thread screw (an axial length can be reduced substantially to half), and is highly effective in reducing the occurrence of the "running over of teeth" phenomenon.

In the meantime, in the feed-screw type transfer mechanism, in order to move the follower member smoothly and at a high speed along the longitudinal axis of the drive shaft, suitable lubrication of a contact portion between the external screw around the external circumference of the drive shaft and the teeth of the follower member is essential. Therefore, a lubricant such as grease is applied to the screw portion of the drive shaft. However, as such a lubricant is usually applied to the screw portion of the drive shaft using a brush or a dispenser, it is extremely difficult in practice to apply the lubricant only to a desired portion so that the lubricant uniformly spreads over the desired portion, especially when a multiple-thread screw, for example, a double-thread screw, is used for the external screw of the drive shaft.

Describing with reference to the FIG. 7, with regard to the screw 143 that is to be engaged with teeth 156 of a follower member 150 (i.e., a screw relating to transferring), in a shipping inspection and the like, rotation of the drive shaft 140 by a certain number causes the follower member 150 to move along the longitudinal axis of the drive shaft 140, and this causes the teeth 156 of the follower member 150 to relatively move along a thread groove 143g of the screw 143 of the drive shaft 140. With this, a lubricant G applied to a feed screw portion 142 of the drive shaft 140 that has been initially non-uniformly pooled in the thread groove 143g spreads thin along the thread groove 143g of the drive shaft 140 uniformly within a range of the movement of the follower member 150.

By contrast, with regard to the screw 144 that is not to be engaged with the teeth 156 of the follower member 150 (i.e., a screw not related to transferring), the lubricant G (e.g., grease) is non-uniformly pooled in the thread groove 144g in an initial state of the application. There is a problem that the lubricant G pooled in the thread groove 144g may spread out of the thread groove 144g and scatter around along with high speed rotation of the drive shaft 140, and then stick to a lens of an optical pick-up device and an optical disc (all of these are not depicted), resulting in a tremendous adverse effect on quality in recording and/or reproduction by the optical disc drive.

As a countermeasure to this problem of scattering of the lubricant, providing a protective cover capable of shielding the optical pick-up device transfer mechanism from the optical disc and the optical pick-up device is conceivable. However, in the case in which such a countermeasure is employed, there are problems of making a structure around the optical pick-up device transfer mechanism highly complicated and considerably increasing the cost.

SUMMARY OF THE INVENTION

The present invention has been made in view of the above problems and it is a basic object of the present invention to provide a feed-screw type optical pick-up device transfer mechanism capable of, with a relatively simple structure, reducing an occurrence of the "running over of teeth" phenomenon when such as an impact load is applied. Another basic object of the present invention is to provide such a transfer mechanism capable of, with a relatively simple structure, making uniform an application condition of a lubricant applied to a contact portion between an external screw of an external circumference of a drive shaft and teeth of a follower member as well as reducing scattering of the lubricant.

Thus, an optical pick-up device transfer mechanism according to the present invention is one for transferring an optical pick-up device, the mechanism comprising: a drive shaft having an external screw threaded around an external circumference thereof; a follower member having teeth; and a base member coupled to the follower member, the optical pick-up device being transferred by the base member in a state in which the teeth are engaged with the external screw, wherein the external screw of the drive shaft is configured by a multiple-thread screw such that at least one separate external single-thread screw is threaded between threads of a single-thread external screw that is engaged with two main teeth, and wherein the teeth of the follower member include the two main teeth and at least one subsidiary tooth, the main teeth relating to the transfer of the optical pick-up device, the subsidiary tooth being provided between the two main teeth and not related to the transfer of the optical pick-up device.

According to the present invention, by configuring the external screw of the drive shaft as a multiple-thread screw, a circumferential surface portion of an outer circumference provided between adjacent thread grooves of a screw portion can be decreased as compared to a case using a common single-thread screw, and therefore it is possible to reduce, with a relatively simple structure, an occurrence of the "running over of teeth" phenomenon when such as an impact load is applied. In addition, the teeth of the follower member include the two main teeth relating to the transfer of the optical pick-up device and at least one subsidiary tooth provided between the two main teeth and not related to the transfer of the optical pick-up device. Therefore, for a screw that is not engaged with the main tooth of the follower member (that is, the screw not related to the transfer), the subsidiary tooth of the follower member also relatively moves along the thread groove of the screw not related to the transfer along with the movement of the follower member due to the rotation of the drive shaft. Accordingly, the lubricant applied to the screw portion of the drive shaft that has been pooled non-uniformly in the thread groove in the initial state of the application can uniformly spread thin within the range of movement of the follower member along the thread groove of the screw not related to the transfer. As a result, the lubricant may not remain non-uniformly pooled in the thread groove. In other words, it is possible to make uniform an application condition of the lubricant, and to effectively reduce scattering of the lubricant with a relatively simple structure when the drive shaft rotates at a high speed.

BRIEF DESCRIPTION OF THE DRAWINGS

The present invention is described in more detail below with reference to accompanying drawings.

DETAILED DESCRIPTION OF THE PREFERRED EMBODIMENTS

Figure 1:
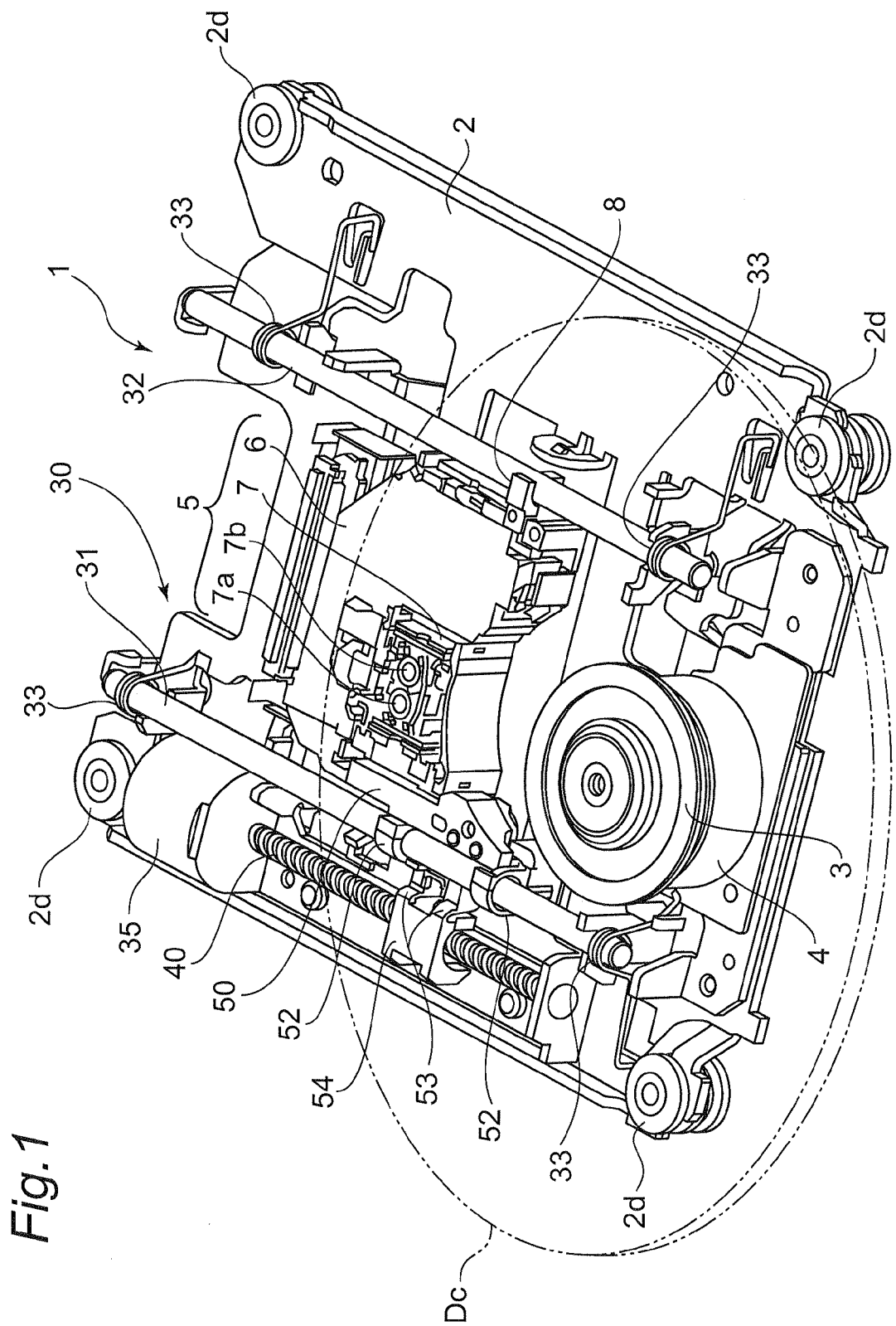
FIG. 1 is an overall perspective view illustrating a traverse unit provided with an optical pick-up device transfer mechanism according to an embodiment of the present invention as viewed obliquely downward.

Based on the above configuration, the optical pick-up device transfer mechanism according to the present invention can be implemented according to aspects described below. Specifically, in the optical pick-up device transfer mechanism, it is preferable that each main tooth be configured such that a traverse section of a tip end thereof is substantially formed in a semicircular shape.

According to this configuration, an area of contact between the tooth edges of the main teeth and an inclined surface of a thread groove of the external screw can be minimized (to be substantially a point contact). With this, it is possible to perform smooth transfer in low friction, and to contribute to the transfer at a high speed and with high accuracy.

Further, in this case, it is preferable that the subsidiary tooth be configured such that a traverse section of a tip end thereof is substantially formed in a semicircular shape whose radius being smaller than that of the tip ends of the main teeth.

According to this configuration, it is possible to avoid that the tooth edge of the subsidiary tooth is brought into contact with the inclined surface of the thread groove even in the state in which the subsidiary tooth is engaged with the screw not related to the transfer of the optical pick-up device. Therefore, employing a multiple-thread screw for the external screw around the external circumference of the drive shaft and providing the subsidiary tooth for the teeth of the follower member may not increase contact portions and hinder the transfer of the optical pick-up device at a high speed and with high accuracy.

In the above cases, the follower member can include a main body coupled to the base member; a nut piece swingably supported by the main body, the nut piece having a teeth base plate provided with the teeth on a surface facing against the drive shaft; and an urging member configured to urge the teeth base plate against the drive shaft.

According to this configuration, the teeth base plate is urged against the drive shaft by the urging member in the state in which the nut piece is swingably supported by the main body. This allows the teeth on the surface of the teeth base plate to be engaged with the external screw of the drive shaft reliably without backlash and the like, and does not require producing accuracy and assembly accuracy to be overly high.

Further, in this case, the nut piece can further include a side supporting plate configured to support a side of the drive shaft and facing against the teeth base plate.

According to this configuration, when the nut piece is caused to move to an opposite side of the drive shaft due to an impact load, in addition to a fact that an urging force toward the drive shaft is exerted by the urging member, the side supporting plate is brought into contact with the drive shaft. Thereby, a movement of the nut piece to the opposite side of the drive shaft is reliably restricted within a certain range. Therefore, it is possible to effectively restrict running over of the teeth to a circumferential surface portion at the outer circumference of the external screw due to disengagement of the teeth of the nut piece from the external screw of the drive shaft.

<Embodiment>

Hereinafter, an embodiment of the present invention will be described in detail with reference to the accompanying drawings.

Terms indicating specific directions in the following description (for example, "up", "down", "left", "right", "front", "back", and a term including any of these, "clockwise", "counterclockwise", and the like) are only used to facilitate understanding of the invention with reference to the drawings, and the present invention should not be interpreted in a narrow sense based on these terms.

Figure 2:
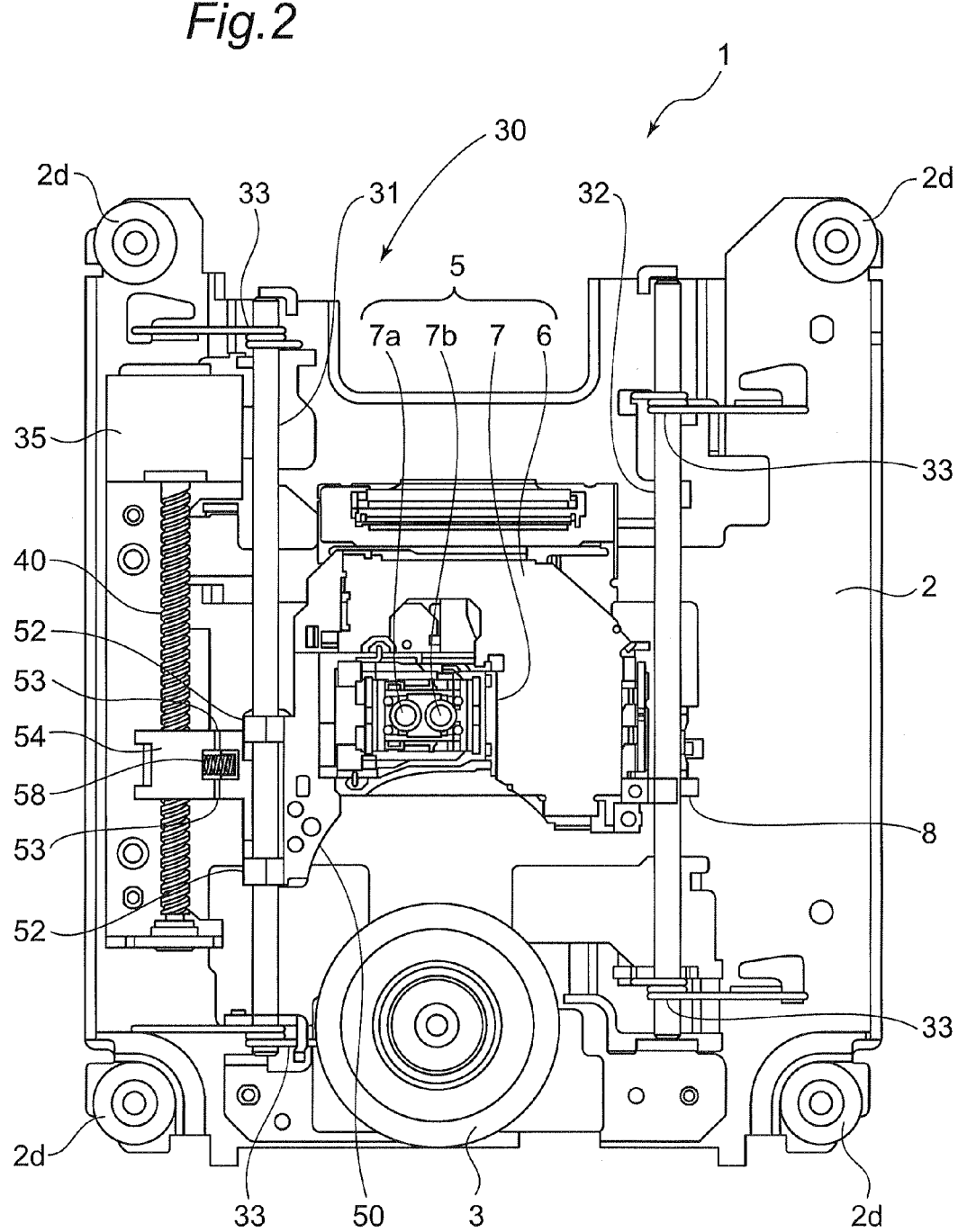
FIG. 2 is a plan view illustrating the traverse unit.

FIG. 1 is an overall perspective view illustrating a traverse unit provided with an optical pick-up device transfer mechanism according to the embodiment of the present invention as viewed obliquely downward. Further, FIG. 2 is a plan view illustrating the traverse unit.

As illustrated in the figures, a traverse unit 1 provided with an optical pick-up device transfer mechanism 30 according to this embodiment includes a traverse base 2 that is substantially rectangular or square in a planar view. And, dampers 2d configured by elastic members are attached to four corners of the traverse base 2. The traverse base 2 is supported in a floating (vertically floatable) state to a casing of a disc drive (not depicted) with the four dampers 2d interposed therebetween.

The traverse base 2 is provided with a turntable 3 that rotatably supports an optical disc Dc, a spindle motor 4 that drives the turntable 3 to rotate, and an optical pick-up device 7 for recording an information signal on the disc Dc and/or reproducing an information signal recorded on the disc Dc. The optical pick-up device 7 is provided with two lenses of a BD lens 7a and a DVD lens 7b, for example, and the lenses 7a and 7b are attached vertically-movably to a base member 6 (pick-up base) made of resin. A pick-up unit 5 is configured by mounting the optical pick-up device 7 onto the pick-up base 6. Further, the transfer mechanism 30 (optical pick-up device transfer mechanism) that transfers the pick-up unit 5 (thus, the optical pick-up device 7) in a radial direction of an optical disc Dc is disposed over the traverse base 2.

The optical pick-up device transfer mechanism 30 is provided with a main shaft 31 and an auxiliary shaft 32 respectively disposed on both sides of the turntable 3 and the pick-up unit 5 and in parallel with each other, and a drive shaft 40 extends on an outward side of and in parallel to the main shaft 31. The drive shaft 40 is rotatably supported above the traverse base 2 based on a conventionally known supporting structure. The main shaft 31, the auxiliary shaft 32, and the drive shaft 40 are preferably made of metal. Portions near both ends of the main shaft 31 and the auxiliary shaft 32 are urged downward by elastic urging members 33 configured by such as torsion coil springs. With this, the main shaft 31 and the auxiliary shaft 32 are elastically pressure-supported with respect to the traverse base 2. A structure for supporting the main shaft 31 and the auxiliary shaft 32 is conventionally known.

On one end of the drive shaft 40, a motor 35 for driving the drive shaft 40 to rotate is provided. The motor 35 is preferably a stepping motor and its output side is coupled to the one end of the drive shaft 40. Around an external circumference of the drive shaft 40, an external screw 42 as a feed screw of the optical pick-up device transfer mechanism 30 is threaded. The external screw 42 of the drive shaft 40 will be detailed later.

The pick-up base 6 is arranged between the main shaft 31 and the auxiliary shaft 32, and its overall shape is substantially rectangular in a planar view. As used herein, "rectangle" includes "square" as one example.

On the side of the pick-up base 6 closer to the auxiliary shaft 32, a guiding member 8 (slide guide) that is engaged with the auxiliary shaft 32 from the side is integrally provided. The slide guide 8 has a U-shaped groove opening to the side, and the groove is slidably engaged with the auxiliary shaft 32. While on the side of the pick-up base 6 closer to the main shaft 31, as will be described later, a follower member 50 that moves along the drive shaft 40 and the main shaft 31 along with the rotating driving of the drive shaft 40 is integrally coupled. The follower member 50 is integrally provided with a guiding member 52 (slide guide) having an annular hole through which the main shaft 31 is inserted. The slide guide 52 is preferably provided in a pair, each in front and back of the main shaft 31 along its longitudinal direction, slidably receiving the main shaft 31.

Figure 3:
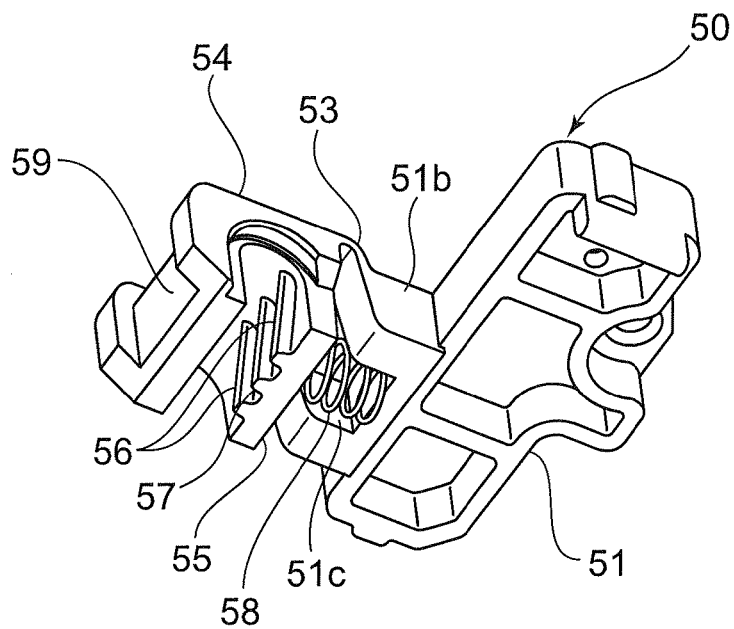
FIG. 3 is a perspective view illustrating a follower member of the optical pick-up device transfer mechanism as viewed obliquely upward.
Figure 4:
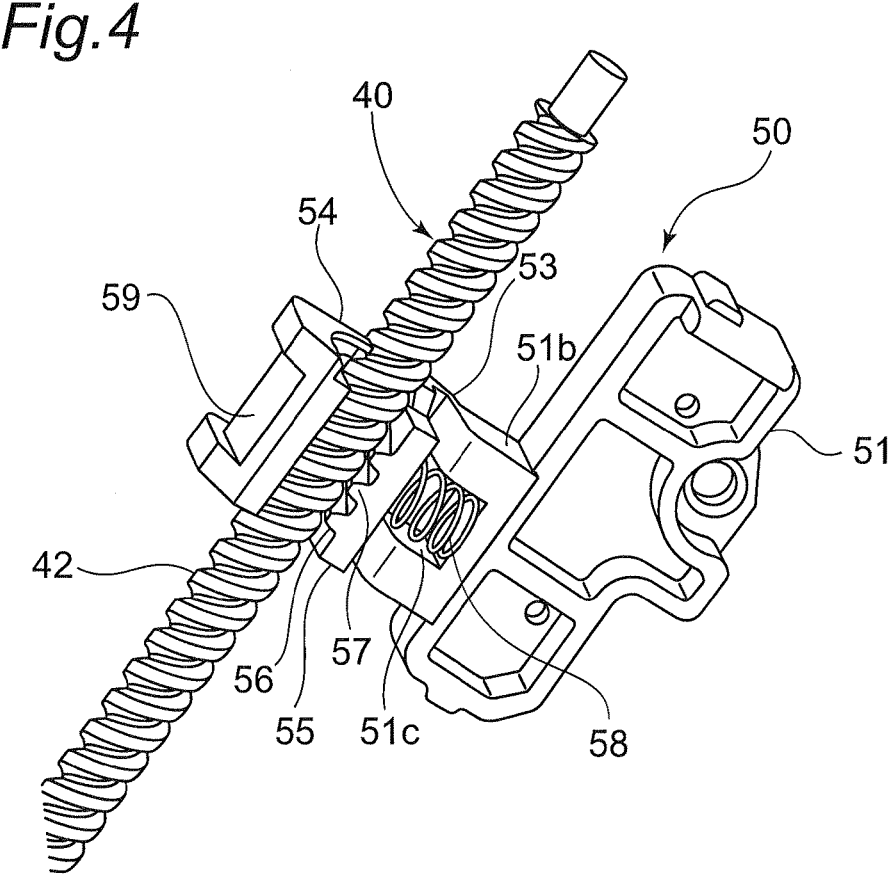
FIG. 4 is a perspective view illustrating an assembled state of the follower member and a drive shaft as viewed obliquely upward.

FIG. 3 is a perspective view illustrating the follower member 50 as viewed obliquely upward, and FIG. 4 is a perspective view illustrating an assembled state of the follower member 50 and the drive shaft 40 as viewed obliquely upward. As can be clearly seen from these figures, the follower member 50 is provided with a main body 51 fixed to the pick-up base 6 and a nut piece 54 provided so as to extend substantially perpendicularly from a side of the main body 51 toward the drive shaft 40, and the nut piece 54 is engaged with the drive shaft 40 from above. The pair of slide guides 52 are provided upside of the main body 51. The nut piece 54 is coupled to a protrusion base 51b provided so as to protrude from a side portion of the main body 51 between the pair of slide guides 52 with a thin arm 53 interposed therebetween, and elastically swingable taking the arm 53 as a pivot point. The arm 53 functions as a so-called resin spring, and provided in a pair, each on a front and a back side. The follower member 50 is integrally molded using a synthetic resin material, for example.

The nut piece 54 is in an overall shape having a longitudinal section of a square U shape opening downward, and provided with a teeth base plate 55 and an external side supporting plate 59 facing toward the teeth base plate 55. The teeth base plate 55 includes teeth 56 and 57 that are engaged with the external screw 42 threaded around the external circumference of the drive shaft 40, and a surface of the teeth base plate 55 facing toward the drive shaft 40 is provided with the two main teeth 56 and the subsidiary tooth 57 provided therebetween. The main teeth 56 and the subsidiary tooth 57 will be detailed later. Further, the external side supporting plate 59 supports an exterior of the drive shaft 40 opposing against the teeth base plate 55. On the other hand, a back surface of the teeth base plate 55 is urged outwardly by a compression urging member 58 configured by a compression coil spring and the like and contained within a recess 51c of the protrusion base 51b. Specifically, the nut piece 54 that is rigid as a whole is urged outwardly by the compression urging member 58 from the back surface of the teeth base plate 55 in a state being supported elastically swingably taking the arm 53 as a pivot point. This allows the teeth 56 and 57 to be engaged with the external screw 42 reliably without backlash and the like, and does not require producing accuracy and assembly accuracy to be overly high.

Further, when the nut piece 54 is caused to move inwardly due to an impact such as a drop impact, in addition to a fact that an outward urging force is exerted by the compression urging member 58, the external side supporting plate 59 is brought into contact with the drive shaft 40. Thereby, an inward movement of the nut piece 54 is reliably restricted within a certain range. Therefore, it is possible to effectively restrict running over of the teeth 56 and 57 to a circumferential surface portion 42c at an outer circumference of the screw portion 42 due to disengagement of the teeth 56 and 57 of the nut piece 54 from the external screw 42 of the drive shaft 40.

According to this embodiment, the feed screw 42 provided around the external circumference of the drive shaft 40 is configured as a multiple-thread screw (specifically, a double-thread screw). Next, the feed screw 42 of the drive shaft 40 and the teeth 56 and 57 of the nut piece 54 that are engaged with the feed screw 42 will be described.

Figure 5:
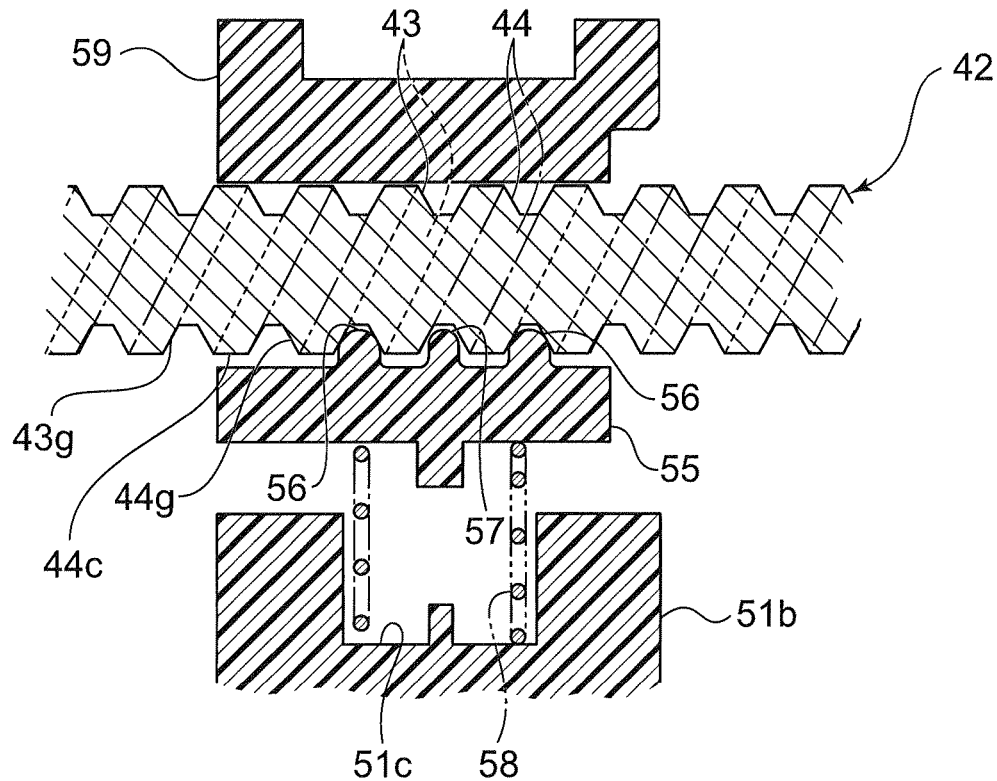
FIG. 5 is a traverse cross-sectional view illustrating the assembled state of the follower member and the drive shaft.

FIG. 5 is a traverse (horizontal) cross-sectional view illustrating the assembled state of the follower member and the drive shaft. Further, FIG. 6 is an enlarged view of a main section in FIG. 5, and a traverse cross-sectional view illustrating an engaged state between the teeth of the follower member and an external screw portion of the drive shaft.

As have been well known, a double-thread feed screw is configured by threading an additional single-thread screw 44 separately provided between threads of a single-thread screw 43 at the same feed pitch. Using such a double-thread screw thus configured can decrease the circumferential surface portion 42c of the outer circumference provided between a thread groove 43g and a thread groove 44g of the screw portion 42 that are adjacent to each other as compared to a common single-thread screw (an axial length can be reduced substantially to half), and therefore it is possible to reduce an occurrence of the "running over of teeth" phenomenon. In this embodiment, the pitch of the feed screw 42 is set to be 3 mm, for example.

On the other hand, as described above, the teeth 56 and 57 of the nut piece 54 are configured by the two main teeth 56 and the subsidiary tooth 57 provided therebetween. The two main teeth 56 are engaged with one of the single-thread screws (e.g., the screw 43) in the double-thread screw 42 (43, 44), and move along the longitudinal axis of the drive shaft 40 by the rotation of the drive shaft 40 while being kept engaged with the screw 43. Along with this movement, the follower member 50 moves. That is, the two main teeth 56 relate to the transfer of the optical pick-up device 7 and are provided "for transfer".

Figure 6:
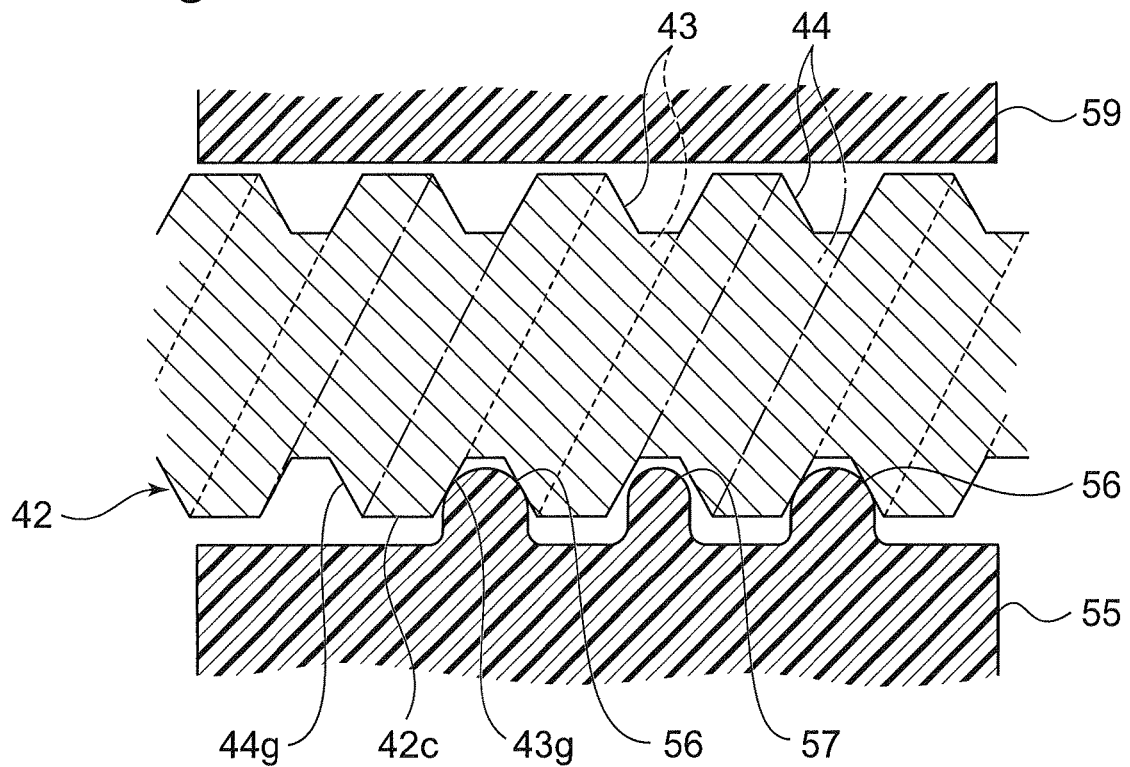
FIG. 6 is an enlarged traverse cross-sectional view of a main section in FIG. 5, illustrating an engaged state between teeth of the follower member and an external screw portion of the drive shaft.
Figure 7:
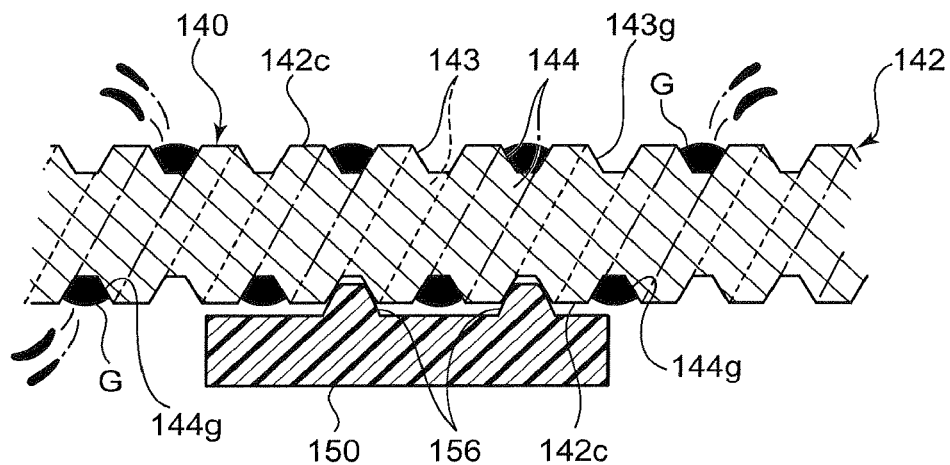
FIG. 7 is a traverse cross-sectional view of an optical pick-up device transfer mechanism according to the conventional example using a double-thread screw as an external screw of a drive shaft, illustrating an engaged state between teeth of a follower member and an external screw portion of the drive shaft.
Figure 8:
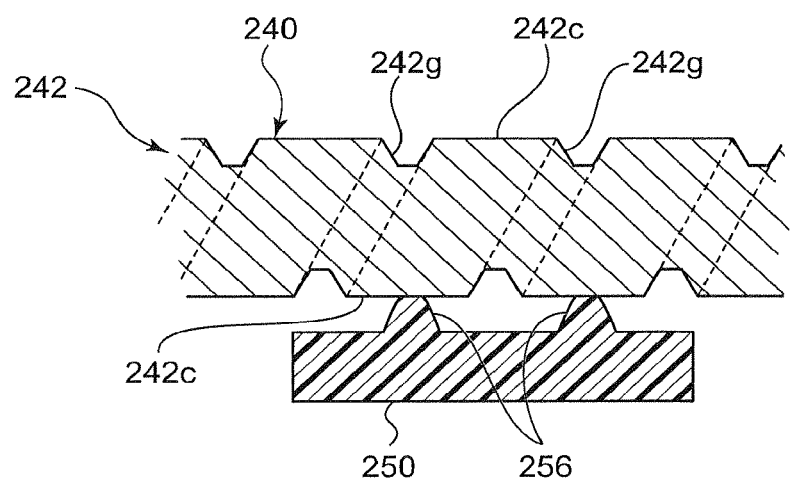
FIG. 8 is a traverse cross-sectional view of the optical pick-up device transfer mechanism according to the conventional example using a single-thread screw as an external screw of a drive shaft, illustrating a "running over of teeth" state.
Figure 9:
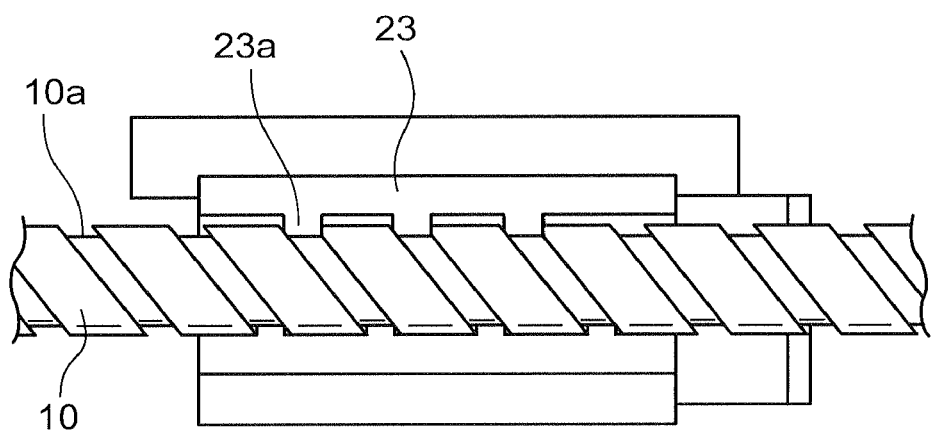
FIG. 9 is an illustrative view of a main section of a feed screw of the optical pick-up device transfer mechanism according to the conventional example.

As can be clearly seen from FIG. 6, a cross section of a tip end of each main tooth 56 is substantially formed in a semicircular shape, and is configured such that a tooth edge of each main tooth 56 may not be in contact with a bottom surface of the thread groove 43g and that an area of contact between the tooth edge of the main tooth 56 and an inclined surface of the thread groove 43g of the screw 43 is minimized (to be substantially a point contact). With this, it is possible to perform smooth transfer in low friction, and to contribute to the transfer at a high speed and with high accuracy.

On the other hand, the subsidiary tooth 57 is positioned between the two main teeth 56 and is engaged with the other of the single-thread screws (e.g., the screw 44) in the double-thread screw 42 (43, 44). Preferably, a traverse section of a tip end of the subsidiary tooth 57 is substantially formed in a semicircular shape whose radius is smaller than that of the tip ends of the main teeth 56, and is configured such that a tooth edge may not be in contact with a bottom surface and an inclined surface of the thread groove 44g even when engaged with the screw 44. That is, the subsidiary tooth 57 does not relate to the transfer of the optical pick-up device 7. Accordingly, employing the double-thread screw 42 (43, 44) for the external screw around the external circumference of the drive shaft 40 and providing the subsidiary tooth 57 for the teeth 56 and 57 of the nut piece 54 may not increase contact portions and hinder the transfer of the pick-up unit 5 (that is, the optical pick-up device 7) at a high speed and with high accuracy.

To the feed screw 42 (43, 44) around the external circumference of the drive shaft 40, a lubricant G such as grease is applied in order to facilitate smooth movement of the follower member 50 at a high speed along the longitudinal axis of the drive shaft 40. The lubricant G is applied using a brush or a dispenser. Therefore, the lubricant G is also applied to the screw 44 not related to the transfer of the optical pick-up device 7, and the surplus lubricant G is pooled in the thread groove 44g of the screw 44 not related to the transfer in an initial state, and may even spread out of the thread groove 44g. According to the conventional configuration that does not include the subsidiary tooth 57, as described above, there is a problem that the surplus lubricant G may scatter around along with high speed rotation of the drive shaft 40, and then stick to the lenses 7a and 7b of the optical pick-up device 7 and the optical disc Dc, resulting in a tremendous adverse effect on quality in recording and/or reproduction by the optical disc drive.

According to this embodiment, since the subsidiary tooth 57 engaged with the screw 44 not related to the transfer is provided, rotating the drive shaft 40 by a certain number in the initial state in which the lubricant G is applied to the screw portion 42 (43, 44) in an shipping inspection and the like, for example, causes the follower member 50 to move along the longitudinal axis of the drive shaft 40, and the lubricant G in the thread groove 44g of the screw 44 not related to the transfer uniformly spreads thin along the thread groove 44g within a range of movement. As a result, it is possible to effectively reduce scattering of the lubricant G even when the drive shaft 40 rotates. In this sense, the subsidiary tooth 57 can also be referred to as a tooth for "anti-scattering against lubricant".

As described above, according to this embodiment, by configuring the feed screw 42 around the external circumference of the drive shaft 40 as a multiple-thread screw (specifically, double-thread screw), the circumferential surface portion 42c of the outer circumference provided between the adjacent thread grooves can be decreased as compared to the case using a common single-thread screw, and therefore it is possible to reduce, with a relatively simple structure, the occurrence of the "running over of teeth" phenomenon when such as an impact load is applied.

In addition, the teeth 56 and 57 of the follower member 50 include the two main teeth 56 relating to the transfer of the optical pick-up device 7 and at least one subsidiary tooth 57 provided between the two main teeth 56 and not related to the transfer of the optical pick-up device 7. Therefore, for a screw that is not engaged with the main tooth of the follower member 50 (that is, a screw not related to the transfer), as the subsidiary tooth 57 of the follower member 50 also relatively moves along the thread groove 44g of the screw 44 not related to the transfer along with the movement of the follower member 50 due to the rotation of the drive shaft 40, the lubricant applied to the screw portion 42 of the drive shaft 40 that has been pooled non-uniformly in the thread groove 44g in the initial state of the application can uniformly spread thin within the range of movement of the follower member 50 along the thread groove 44g of the screw 44 not related to the transfer. As a result, the lubricant may not be non-uniformly pooled in the thread groove 44g.

Accordingly, it is possible to make uniform an application condition of the lubricant with a relatively simple structure, and to effectively reduce the scattering of the lubricant when the drive shaft 40 rotates at a high speed.

While the external screw 42 provided around the outer circumference of the drive shaft 40 is configured as a double-thread screw in the above description, the present invention is not limited to such an example, and it is possible to use a multiple-thread screw having three or more threads. In this case, the number of the subsidiary tooth provided for the follower member can be increased according to the number of threads of the screw.

It should be appreciated that the present invention is not limited to the above embodiment or modified examples described above, and various alterations and improvements in design can be made without departing the spirit of the invention.

The present invention can be effectively utilized as a transfer mechanism for an optical pick-up device used in an optical disc drive.

What is claimed is:

1. An optical pick-up device transfer mechanism for transferring an optical pick-up device, the mechanism comprising:
   a drive shaft having an external screw threaded around an external circumference thereof;
   a follower member having teeth; and
   a base member coupled to the follower member, the optical pick-up device being transferred by the base member in a state in which the teeth are engaged with the external screw,
   wherein the external screw of the drive shaft is configured by a multiple-thread screw such that at least one separate external single-thread screw is threaded between threads of a single-thread external screw that is engaged with two main teeth, and
   wherein the teeth of the follower member include the two main teeth and at least one subsidiary tooth, the main teeth relating to the transfer of the optical pick-up device, the subsidiary tooth being provided between the two main teeth and not related to the transfer of the optical pick-up device.

2. The optical pick-up device transfer mechanism according to claim 1, wherein the follower member includes:
   a main body coupled to the base member;
   a nut piece swingably supported by the main body, the nut piece having a teeth base plate provided with the teeth on a surface facing against the drive shaft; and
   an urging member configured to urge the teeth base plate against the drive shaft.

3. The optical pick-up device transfer mechanism according to claim 2, wherein the nut piece further includes a side supporting plate configured to support a side of the drive shaft and facing against the teeth base plate.

4. The optical pick-up device transfer mechanism according to claim 1, wherein each main tooth is configured such that a traverse section of a tip end thereof is substantially formed in a semicircular shape.

5. The optical pick-up device transfer mechanism according to claim 4, wherein the follower member includes:
   a main body coupled to the base member;
   a nut piece swingably supported by the main body, the nut piece having a teeth base plate provided with the teeth on a surface facing against the drive shaft; and
   an urging member configured to urge the teeth base plate against the drive shaft.

6. The optical pick-up device transfer mechanism according to claim 5, wherein the nut piece further includes a side supporting plate configured to support a side of the drive shaft and facing against the teeth base plate.

7. The optical pick-up device transfer mechanism according to claim 4, wherein the subsidiary tooth is configured such that a traverse section of a tip end thereof is substantially formed in a semicircular shape with a radius smaller than that of the tip ends of the main teeth.

8. The optical pick-up device transfer mechanism according to claim 7, wherein the follower member includes:
   a main body coupled to the base member;
   a nut piece swingably supported by the main body, the nut piece having a teeth base plate provided with the teeth on a surface facing against the drive shaft; and
   an urging member configured to urge the teeth base plate against the drive shaft.

9. The optical pick-up device transfer mechanism according to claim 8, wherein the nut piece further includes a side supporting plate configured to support a side of the drive shaft and facing against the teeth base plate.

* * * * *